Dec. 6, 1927.  
G. W. CALVERT  
HELICOPTER  
Filed Feb. 2, 1926  
1,652,090  
4 Sheets-Sheet 1
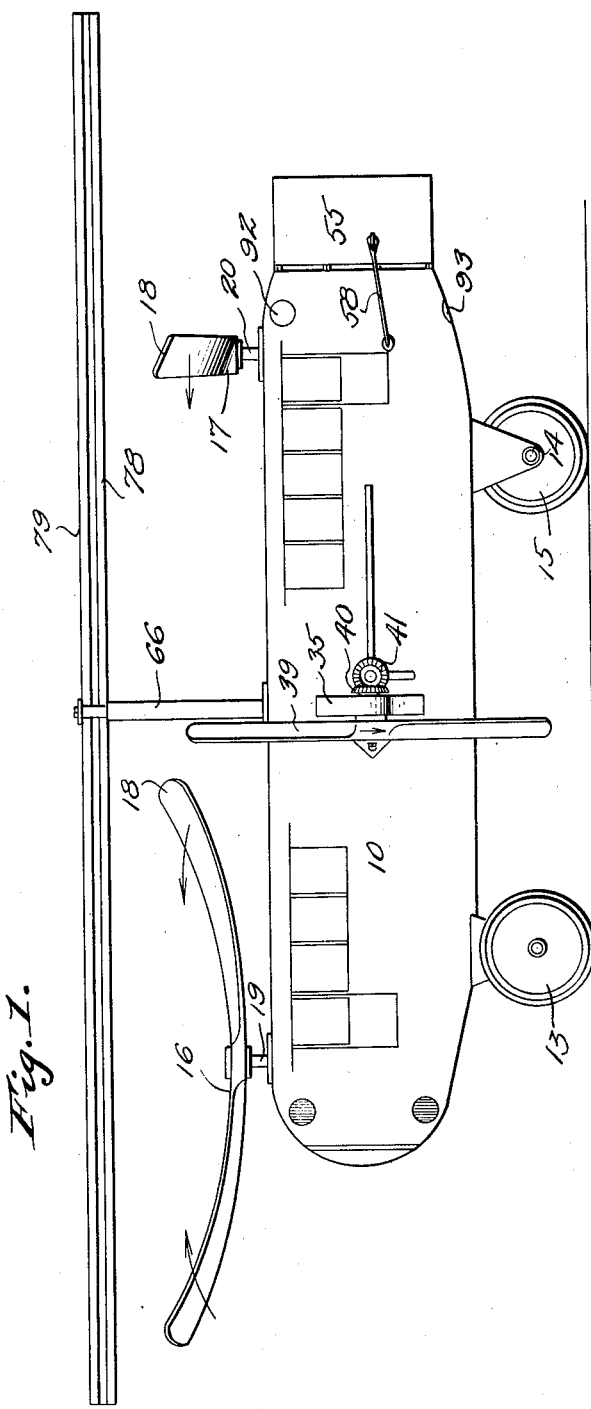
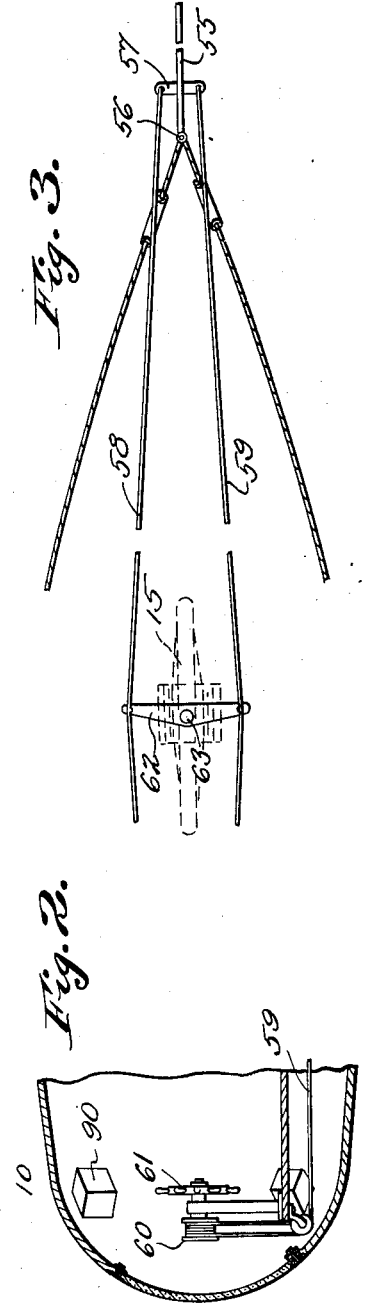
George W. Calvert  
INVENTOR Dec. 6, 1927.
G. W. CALVERT
HELICOPTER
Filed Feb. 2, 1926
1,652,090
4 Sheets-Sheet 2
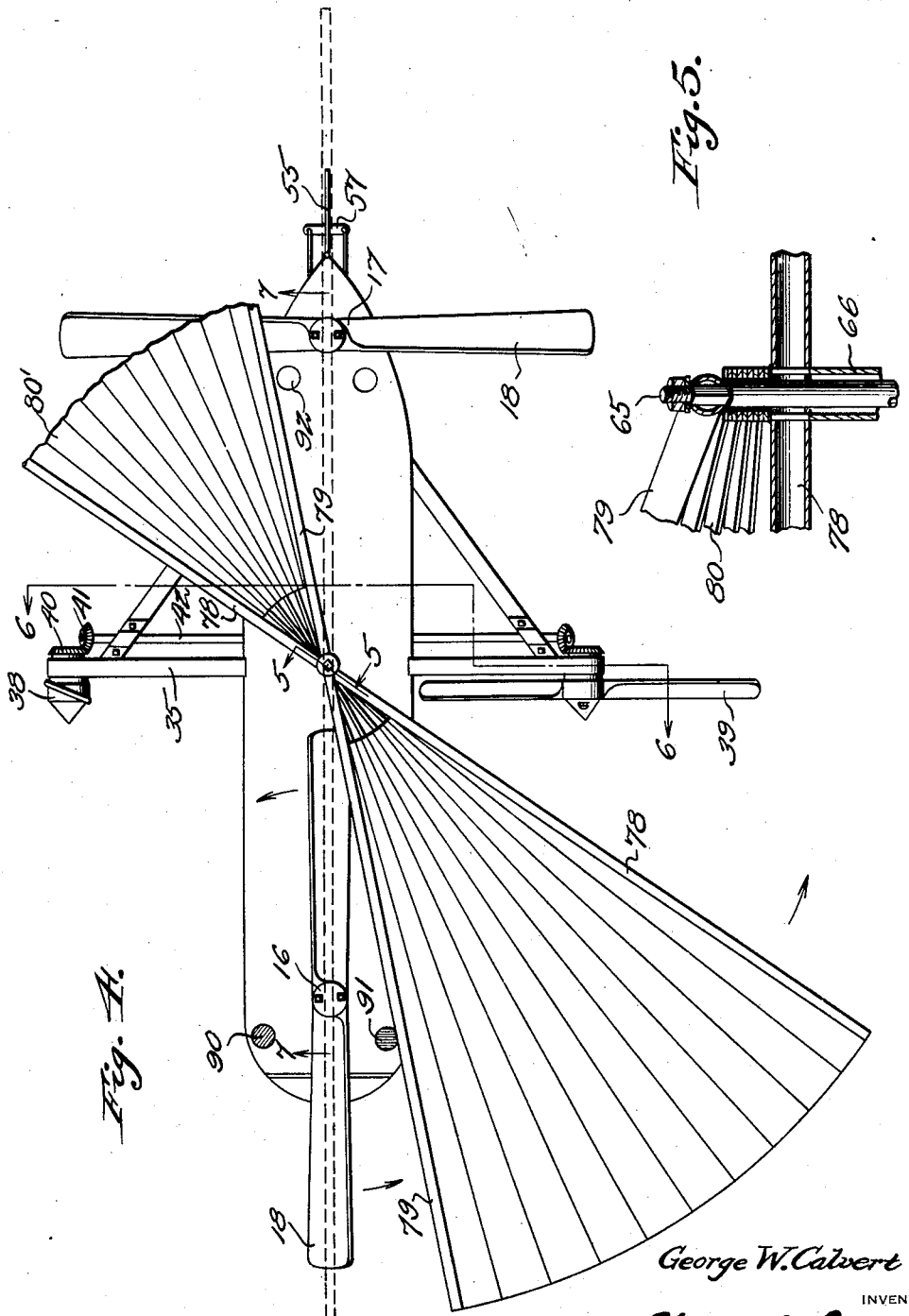

Dec. 6, 1927.
G. W. CALVERT
HELICOPTER
Filed Feb. 2, 1926
1,652,090
4 Sheets-Sheet 3
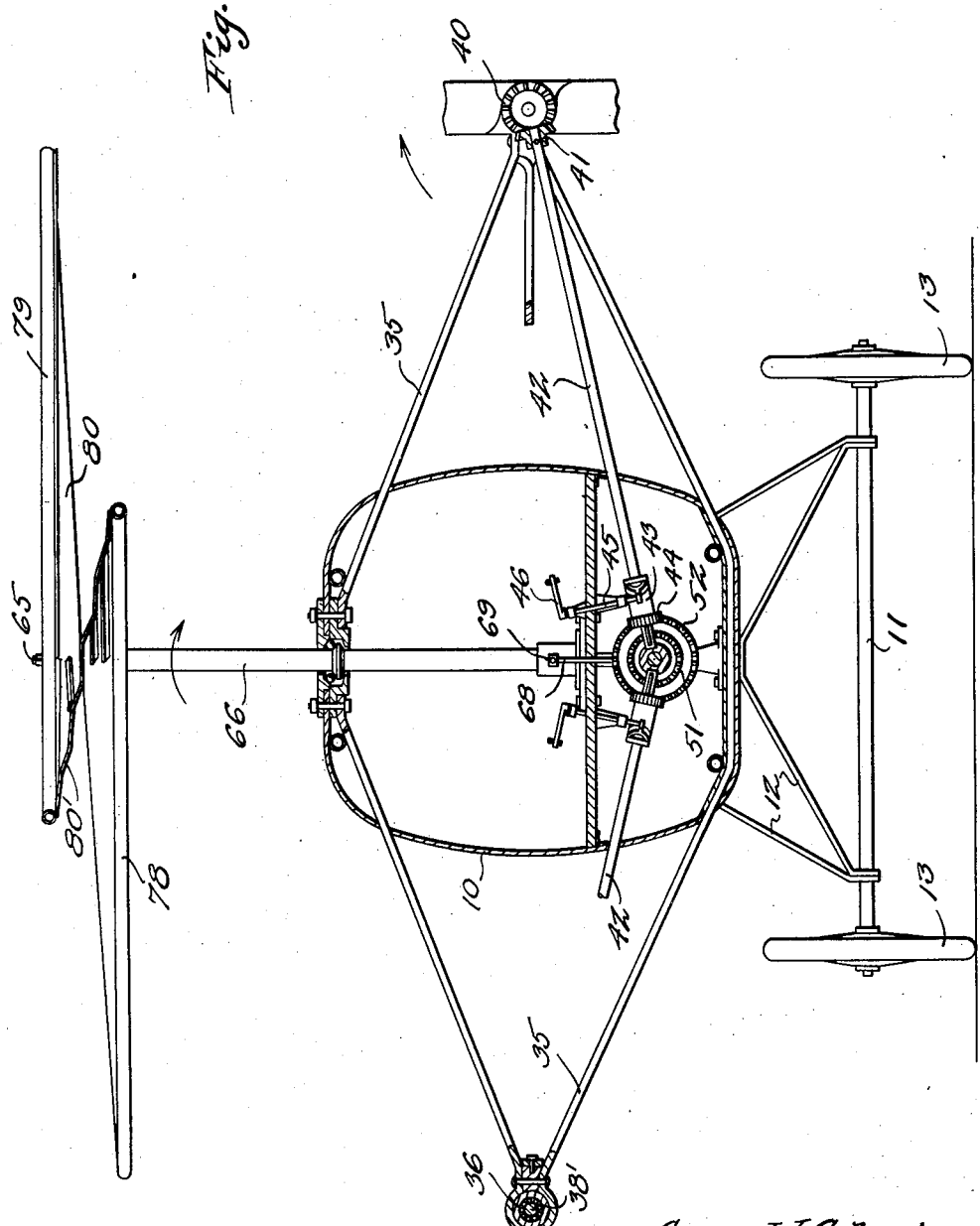

Dec. 6, 1927.  1,652,090
G. W. CALVERT
HELICOPTER
Filed Feb. 2, 1926   4 Sheets-Sheet 4
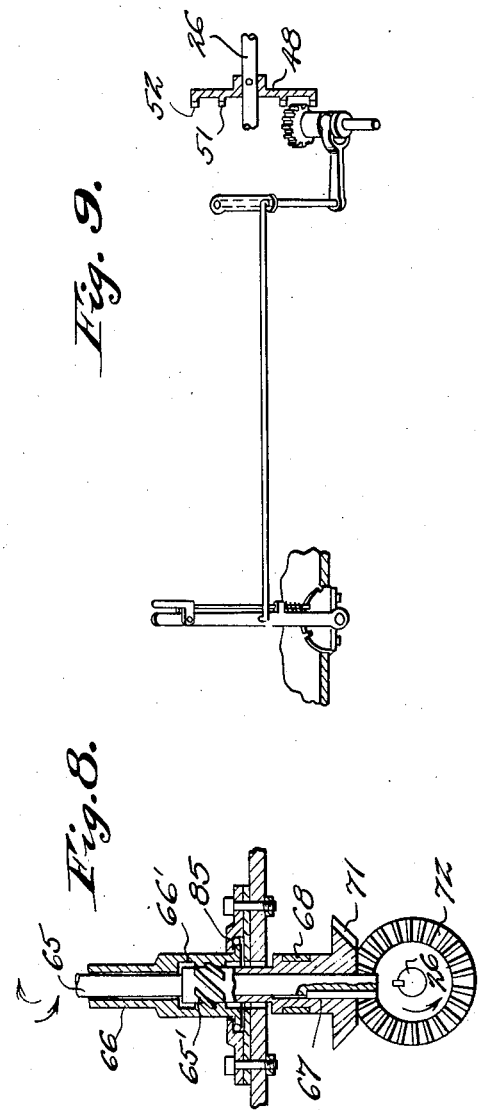
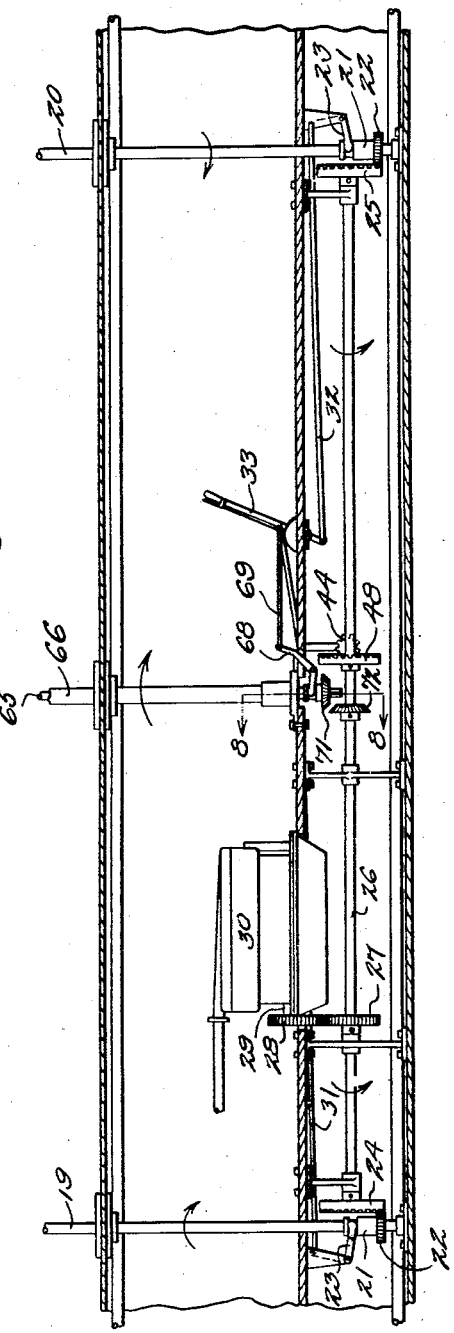
George W. Calvert
INVENTOR
BY Victor J. Evans
ATTORNEY Patented Dec. 6, 1927.

1,652,090

UNITED STATES PATENT OFFICE.

GEORGE W. CALVERT, OF RUSHVILLE, MISSOURI.

HELICOPTER.

Application filed February 2, 1926. Serial No. 85,540.

The object of this invention is to provide a heavier than air machine of the helicopter type, this machine including elevating propellers of special construction, means for driving the propellers by one or more engines, and special means for imparting movement to the propellers in the event of failure of the engine or engines.

A further object is to provide a machine of this type with a special rotatable element mounted on a vertical shaft, and adapted to rotate under air pressure, in the event that prompt landing is required, due to mechanical defects, or to other causes, and serviceable under any circumstances in which the landing space is limited.

A further object is to provide particular means for throwing the power operated means into operative relation, under the conditions likely to exist at any particular time, and particular guiding means.

With the foregoing and other objects in view, the invention consists in the novel construction and arrangement of elements described, illustrated and claimed, it being understood that modifications may be made within the scope of claims, without departing from the spirit of the invention.

In the drawings forming part of this application,

Figure 1 shows the machine in elevation.

Figure 2 is a fragmentary view in vertical section showing a portion of the controlling means.

Figure 3 is a fragmentary view in plan showing another portion of the controlling means.

Figure 4 is a plan view of the complete machine.

Figure 5 is a detail, partly in vertical section, on the line 5—5 of Figure 4.

Figure 6 is a view in transverse section, in a vertical plane, represented by the line 6—6 of Figure 4.

Figure 7 is a view partly in vertical section, with certain of the driving elements, and the propeller shafts in elevation, the section being on line 7—7 of Figure 4.

Figure 8 is a detail in vertical section, on line 8—8 of Figure 7.

Figure 9 shows one of the controlling levers and the connections therefor.

The body portion of the machine is designated 10, and may be of any suitable configuration. A forward axle 11 is mounted in a suitable supporting structure or frame 12, and carries ground wheels 13, the rear axle 14 mounting ground wheel 15.

The elevating propellers 16 and 17 include blades 18, curved upwardly with reference to the hub portion, and reversely, in a direction transversely of the individual blades. These propellers are mounted on vertical shafts 19 and 20, and splined on the shafts are sleeves 21, carrying rigidly therewith gear wheels 22. The sleeves are provided with annular grooves with which the forked ends of angle levers 23 cooperate. Gear wheels 22 are adapted to mesh, when controlled, by the operating means, with wheels 24, 25, on line shaft such as 26 carrying a gear wheel 27 keyed thereon and meshing with gear wheel 28 on shaft 29 of engine 30.

The sleeves 21, constituting clutch elements, and especially the angle levers 23, are directly controlled by the rods 31 and 32 and by lever 33, by means of which the elevating propellers 16 and 17 are thrown into and out of operation.

Extending laterally from the body portion 10 of the machine, are frames or the like including elements 35 designed to support bearings 36 for the axial members of side propellers 38 and 39. The axial elements referred to are designated 38', each carrying rigidly thereon a gear wheel such as 40 meshing with gear wheel 41 on shaft 42, the shaft extending transversely of the machine, and carrying on the inner end thereof sleeve or the like 43 mounting gear wheel 44. These clutch elements are controlled by rods 45 and arms 46 within the reach of the operator of the machine. The gear wheels 44 are adapted to mesh with gear wheel 48 fixed on line shaft 26, so that the four propellers just referred to are adapted to be driven from the main shaft and from the engine or engines providing the driving power.

Two series of teeth are provided on wheel 24, 25 and 48, these series being designated 51 and 52 and a plurality of speeds are thus provided.

A rudder 55 is mounted on a vertical axis at 56, and a transverse arm or bar 57 is controlled by cables 58 and 59, or by the two portions of a single cable passing over the drum 60 of steering wheel 61. The cables also control transverse bar 62 on standard 63 of ground wheel 15.

While the propellers are to be driven under normal conditions, in the manner described, they may also be driven in the event of forced landing by means of a special device to which motion is imparted by the current of air, incident to descent by gravity, this special device or fan being carried by vertical shaft 65 mounted centrally of the machine, and operating in concentric tubular element 66. This shaft carries a splined sleeve 67 on its lower end, controlled by the forked end of lever 68 and by connecting rod 69 and lever 33. Said sleeve on vertical shaft 65, constitutes a clutch element and carries a gear wheel 71 adapted to mesh with gear wheel 72 fixed on shaft 26, so that when the engine or engines designed to impart power to the line shaft, fail temporarily, the emergency driving means may be thrown into operation, by causing gear wheels 71 and 72 to mesh, whereby the centrally mounted driving element or fan will greatly impede the descent, and provide a safe landing, because of the drive imparted to the elevation propellers, in a similar direction to that required for lifting the machine.

The emergency propeller or fan includes the arms extending at an angle with reference to each other and designated 78 and 79. These arms are tubular, and are shown in detail in Figure 5, wherein I have also shown individual folds 80 of a flexible element or fabric designated 80' and having segmental form, so that the section of fabric between adjacent end portions of arms 78 and 79, will collapse and expand like a folding fan. This arrangement permits the folding of the blades of the emergency propeller, so that the arms 78 and 79 may lie in parallel relation, but also permits of the unfolding operation. It will be understood that the edge portions of fabric 80' are connected respectively with the arms 78 and 79, and that the upper arm of Figure 5 is rotatable with the shaft 65, and the lower transverse arm of Figure 5 is thereafter rotatable with the vertical tubular member 66.

Figures 7 and 8 show the manner of opening and mounting the emergency propeller, and when sleeve 67 is thrown to position for causing gear wheel 71 to mesh with gear wheel 72, the central shaft 65 begins to rotate, and this shaft carries a thread or worm 65' cooperating with an internal spiral channel in bore 66' of outer tube 66. This provides for elevating one of the main arms of the emergency propeller and imparting partial rotation thereto with reference to the other arm, thereby unfolding the fabric 80', in such manner that the equivalent of blades is provided. When the worm 65' has reached its limit of movement at 65'', after a very brief interval, shaft 65 and tube 66 will rotate together, these elements forming concentric shafts in this sense, and the lower end of element 66 having a base portion rotatable in a bearing of any suitable type, such as that shown at 85.

At the forward end of the body 10, I have shown lamps, and the lamp 90 may be assumed to be a green light and the lamp 91 a red light. White stern lights are designated 92 and 93.

Having thus described the invention, what is claimed as new, is:—

1. In a device of the class described, a body portion, a power unit mounted therein, a plurality of propellers, a line shaft and gearing driven thereby for imparting motion to the propellers, collapsible means comprising radial elements relatively movable and operated by air currents when descending, and devices for throwing the means last named into operative relation with some of the propellers.

2. In a machine of the class described, a body portion, a power unit mounted therein, propellers for imparting forward or reverse drive, lifting propellers, a line shaft, an emergency propeller comprising flexibly connected radial elements, this propeller being operated by an air current due to the descent of the machine, and devices for throwing the means last named into operative relation with the lifting propellers.

3. In a machine of the class described, a body portion, a power unit mounted therein, propellers for imparting forward or reverse drive, lifting propellers, a line shaft, an emergency propeller operated by an air current due to the descent of the machine, this propeller including collapsible blades, and devices for throwing the means last named into operative relation with the lifting propellers.

4. In a machine of the class described, a body portion, a power unit mounted therein propellers for imparting forward or reverse drive, lifting propellers, a line shaft, an emergency propeller operated by an air current due to the descent of the machine, this propeller including collapsible blades, devices for throwing the means last named into operative relation with the lifting propellers, and means for placing the blades of the emergency propeller in operative position before imparting drive to this propeller.

5. In a machine of the class described, a body portion, a plurality of power driven vertical shafts mounted in said body portion, blades mounted on the shafts, an engine and mechanism driven thereby for driving the propellers, and means automatically operable incident to the descent of the machine for independently driving said propellers, the means last named including a plurality of relatively movable radial elements and concentric shafts mounting these elements, one of the shafts being initially rotatable with reference to the other.

In testimony whereof I affix my signature.

GEORGE W. CALVERT.